US006995549B2

(12) United States Patent
Walters

(10) Patent No.: US 6,995,549 B2
(45) Date of Patent: Feb. 7, 2006

(54) DC-TO-DC POWER REGULATOR HAVING NON-LINEAR LOAD LINE AND AUTOMATIC LEAKAGE CURRENT OFFSET ADJUSTMENT

(75) Inventor: Michael M. Walters, Apex, NC (US)

(73) Assignee: Intersil Americas Inc., Milpitas, CA (US)

( * ) Notice: Subject to any disclaimer, the term of this patent is extended or adjusted under 35 U.S.C. 154(b) by 246 days.

(21) Appl. No.: 10/685,365

(22) Filed: Oct. 14, 2003

(65) Prior Publication Data

US 2005/0077883 A1    Apr. 14, 2005

(51) Int. Cl.
*G05F 1/40*    (2006.01)

(52) U.S. Cl. .................................... 323/273

(58) Field of Classification Search ............... 323/270, 323/273, 274, 275, 279, 280, 282, 284, 285
See application file for complete search history.

(56) References Cited

U.S. PATENT DOCUMENTS

| | | | | |
|---|---|---|---|---|
| 5,270,657 A | * | 12/1993 | Wirth et al. | ................. 324/322 |
| 5,903,447 A | * | 5/1999 | Takahashi et al. | ........ 363/21.08 |
| 6,710,279 B1 | * | 3/2004 | Higashi | ................... 219/69.13 |

* cited by examiner

Primary Examiner—Matthew V. Nguyen
(74) Attorney, Agent, or Firm—Allen, Dyer, Doppelt, Milbrath & Gilchrist, P.A.

(57) ABSTRACT

A voltage regulator exhibits a load line that is piecewise linear. This piecewise linearity variation has a first constant voltage segment $V_{LEAK}$ at which output voltage is regulated for output currents less than or equal to the leakage current $I_L$. The output voltage $V_{LEAK}$ corresponds to the maximum output voltage allowable at the leakage current for a given operational range specification. The piecewise linearity variation further includes a second, linearly decreasing segment that varies from the maximum allowable output voltage $V_{LEAK}$ at the leakage current to a full load voltage $V_{DROOP}$ at full load current $I_{FL}$. This serves to effectively maximize the available output voltage swing in the presence of a leakage current offset. The piecewise linear load line is adjustable to accommodate changes in leakage current.

10 Claims, 2 Drawing Sheets

DC-TO-DC POWER REGULATOR HAVING NON-LINEAR LOAD LINE AND AUTOMATIC LEAKAGE CURRENT OFFSET ADJUSTMENT

FIELD OF THE INVENTION

The present invention relates to DC power supply systems and subsystems thereof, and is particularly directed to a new and improved DC-to-DC converter architecture having a piecewise linear load line that maximizes the available output voltage swing ($V_{DROOP}$) in the presence of a leakage current offset, and which automatically accommodates variations in the value of the leakage current offset.

BACKGROUND OF THE INVENTION

The supply current drawn by a microprocessor, such as may be used in notebook, desktop, and system server. applications, typically varies over a relatively wide range and depends upon its activity level. For example, when the clock to the microprocessor is turned on, a substantial capacitive charging and discharging current is drawn; on the other hand, when the clock is turned off, only a leakage is drawn. Now even though there is in fact a leakage current, the power supply specifications of manufacturers of microprocessors often assume zero leakage current, and a prescribed maximum current (e.g., on the order of 100 amps). Moreover, microprocessor manufacturers recognize that as the current switches between relatively low and relatively high current values, the voltage regulator produces a transient on its output voltage.

This transient effect is shown in the timing diagrams of FIGS. 1 and 2. In particular, FIG. 1 shows a relatively large increase (large or full load demand) in current I at a time t0 and a relatively large current decrease (negligible or no load demand) at time t1. FIG. 2 shows a 'droop' 21 in the output voltage of the regulator that is associated with (and having an undershoot that slightly lags) the increase in current at time t0, and an overshoot in the recovery of the output voltage to its no load condition 22 that is associated with (and slightly lags) the decrease and return to a no load condition in current at time t1. The droop differential must fall within the safe operating range of the microprocessor. The droop level 21 of the output voltage is a data integrity limit below which data can expected to be lost, while the upper level 22 of the output voltage is a reliability limit that serves to avoid stressing the gates of the microprocessor.

In an effort to deal with these limits, rather than specifying that the voltage regulator must deliver a constant output voltage, microprocessor manufacturers specify a load line wherein the regulated voltage decreases linearly with increase in current, which allows the regulated voltage to vary during normal operation. This is graphically shown in FIG. 3, which depicts a nominal load line 31 midway between an upper load line specification limit 31U and a lower load line specification limit 31L.

Now although a load line specification is acceptable where the leakage current is in the vicinity of zero amps, it becomes problematic as the leakage current increases, as it effectively 'squeezes' the output voltage range over which the converter may regulate. This leakage current issue becomes especially non-trivial as semiconductor manufacturers continue to reduce line widths and thickness of gate oxides of the integrated circuits they produce, which have lead to body leakage and tunneling across the gate oxide.

Indeed, as graphically shown at 33 in FIG. 3, the leakage component of the output current can be on the order of 30%–40%, or greater, of the total current. This effectively means that when the current transitions from a no load condition to a full load condition, as described above with reference to FIG. 1, the current actually transitions from a substantial leakage current value to a full load current value, as shown at 34 in FIG. 3. The associated voltage transient response resulting from the load line is shown at 35 as transitioning between a leakage voltage value $V_{LEAK}$, which is less that the value it would have at zero leakage current, and a full load voltage value $V_{FULL\ LOAD}$, the latter being less than the leakage voltage value by the differential voltage $V_{DROOP}$, as shown.

In addition to being a non-negligible parameter, the leakage current is highly variable among manufactured part populations and may have a range of variation as large as three or four to one.

SUMMARY OF THE INVENTION

In accordance with the present invention, there is provided a voltage regulator which exhibits a load line that is piecewise linear. This piecewise linearity variation has a first constant voltage segment $V_{LEAK}$ at which output voltage is regulated for output currents less than or equal to the leakage current $I_L$. The output voltage $V_{LEAK}$ corresponds to the maximum output voltage allowable at the leakage current for a given operational range specification. The piecewise linearity variation further includes a second, linearly decreasing segment that varies from the maximum allowable output voltage $V_{LEAK}$ at the leakage current to a full load voltage $V_{FULL\ LOAD}$ or $V_{DROOP}$ at full load current $I_{FL}$, so as to effectively maximize the available output voltage swing in the presence of a leakage current offset. In addition, the piecewise linear load line is automatically adjusted as necessary to accommodate changes in leakage current.

To this end, the DC converter architecture of the invention comprises an error amplifier having a first input coupled to a reference input voltage $V_{REF}=V_{NO\ LOAD}$. A second input of the error amplifier is coupled to the output of a voltage summing unit. The voltage summing unit combines the DC converter's output voltage with a voltage that is a function of the output current defined by the piecewise linear load line described above. The output of the error amplifier is coupled to a power converter, the output of which drives a load, such as a microprocessor, whose operation is controlled by a clock signal. A stop clock line that is common on computing platforms effectively reduces the microprocessor load to the leakage current, and the stop clock signal is used to sample leakage current.

A current measurement probe is coupled to the output of the power converter and provides an output representative of the output current being supplied to the load. The output current measured by probe is coupled to a piecewise linear transform unit and to a sample and hold unit. The piecewise linear transform unit produces a piecewise linear output voltage that is a function of the output current, based upon the piecewise load line characteristic and in accordance with the value of leakage current drawn by the load. The transform unit produces a zero output voltage for output current values less than or equal to the leakage current, and then a linearly increasing output with increase in output current. The piecewise linear voltage produced by the transform unit is coupled to the summation unit.

The sample and hold unit samples the output current supplied to the load, when clocked by a stop clock signal.

Because the stop clock signal effectively disables the load (microprocessor), the value of the current probe's output, as sampled by the sample and hold unit, is effectively representative of the leakage current and serves as a leakage current offset value that is coupled to the transform unit. The sampled leakage current is held by the sample and hold unit during the interval that the stop clock is unasserted.

In operation, for a no load condition the output current as measured by current probe is only the leakage current, which is controllably is sampled by sample and hold unit in accordance with the stop clock input and supplied as an offset input to the transform unit. For current values equal to or less than the leakage current, the output of the transform unit is zero. This means that summation unit will sum the output voltage with the zero output of transform unit, so that the output of the summing unit is the output voltage. With the output of the summing unit coupled to the error amplifier, the error amplifier will drive the power converter so as to make the regulated output voltage equal to the voltage reference voltage ($V_{REF}=V_{NL}=V_{LEAK}$) supplied to the non-inverting input of the error amplifier. This corresponds to the uppermost voltage level $V_{LEAK}$ of the piecewise linear load line.

For a full load condition, the output current as measured by the current probe is the full load current. Since this current is substantially larger than the leakage current, the output of the transform unit will be a corresponding large value of voltage. This means that the summation unit will sum the output voltage with the full load voltage $V_{DROOP}$, so that the output of the summing unit 60 will be the sum of the output voltage Vo (=$V_{REF}=V_{LEAK}$) and $V_{DROOP}$. This will cause the error amplifier to drive the power converter so as to make the regulated output voltage equal to the voltage reference voltage ($V_{REF}=V_{NL}=V_{LEAK}$) minus $V_{DROOP}$. This corresponds to the lowermost voltage level at the uppermost value of load current of the piecewise linear characteristic.

DETAILED DESCRIPTION

Figure 4:
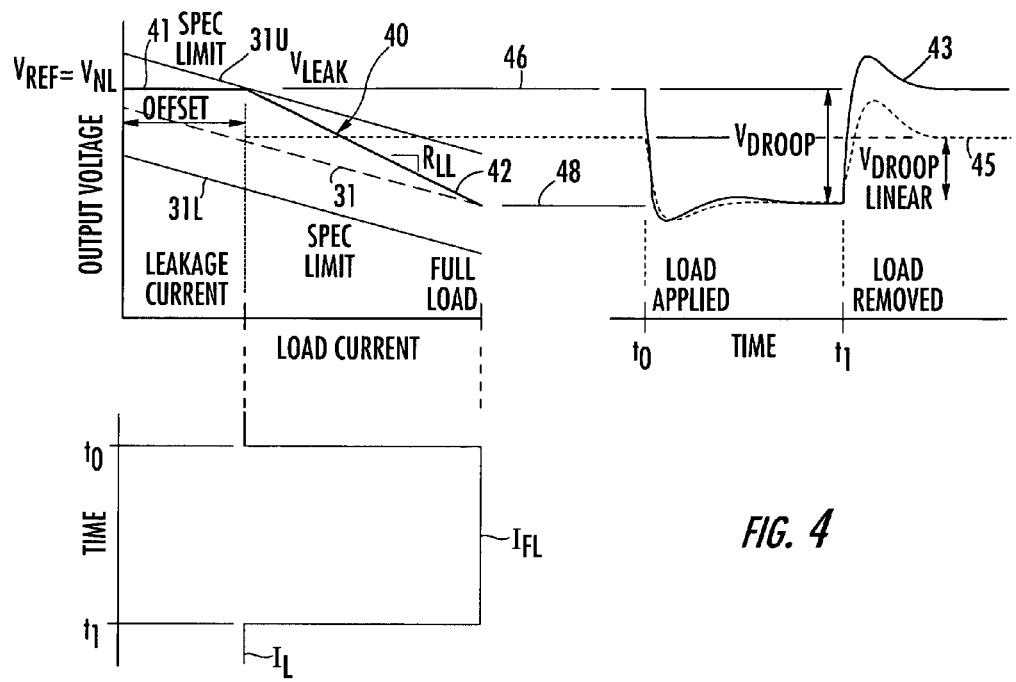
FIG. 4 shows a piecewise linear load line for a DC converter in accordance with the present invention together with associated output current and output voltage variations.

As pointed out briefly above, and as graphically shown in FIG. 4, the voltage regulator of the present invention exhibits a load line 40 that is piecewise linear, as shown by segments 41 and 42. In particular, the flat segment 41 corresponds to the output voltage being regulated at a constant (no load) output voltage $V_{LEAK}$ associated with the leakage current offset value $I_L$ for the upper load line characteristic 31U specified by the user (microprocessor manufacturer) of the DC converter. In the example of FIG. 4, the value of the leakage current $I_L$ is substantial, being on the order of one-third of the total load current. Load line segment 42 decreases linearly with increase in current, from the leakage current-associated voltage value $V_{LEAK}=V_{NOLOAD}$ up to a voltage $V_{FULL\ LOAD}$ at the maximum (full load) current value $I_{FL}$. The resulting voltage transient characteristic is shown at 43.

Figure 1:
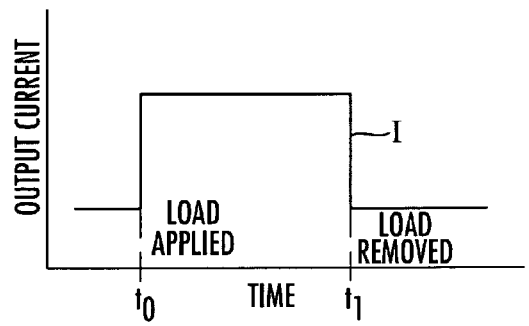
FIG. 1 is a timing diagram showing a variation with time of load current of a DC voltage regulator.
Figure 2:
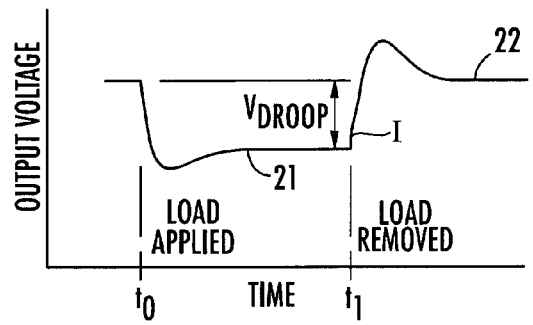
FIG. 2 is a timing diagram showing a variation of output voltage with time in association with the load current variation shown in FIG. 1.
Figure 3:
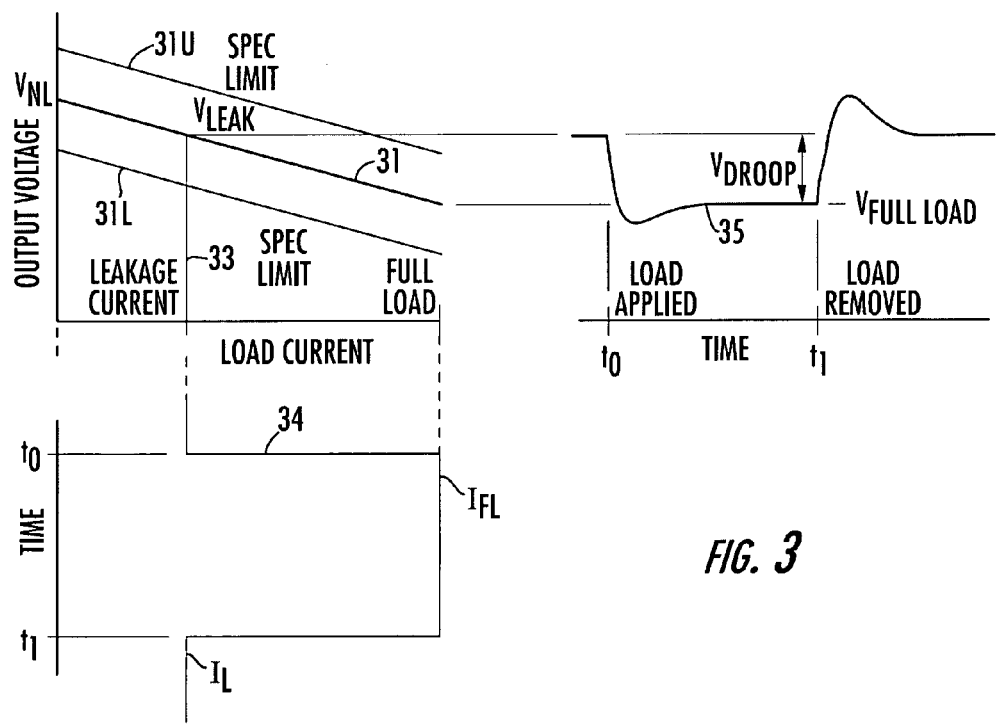
FIG. 3 shows a linear load line for a conventional DC voltage regulator together with associated output current and output voltage variations.

From a comparison of FIG. 4 with FIG. 3, it will be appreciated that the piecewise linear load line of FIG. 4 requires less output capacitance, as the upper boundary of the output voltage has been increased to the upper limit of the range of the output voltage specification, such that the slope ($R_{LL}$) of the linearly decreasing load line is steeper in FIG. 4 than for the load line in FIG. 3. Since the slope of the load line defines the magnitude of the effective output resistance of the regulator, this means that the effective series resistance (ESR) is larger, thereby reducing the amount of output capacitance required. For the present example (where the leakage current is on the order of one-third of the total current), FIG. 4 also shows in broken lines 45 a superposition of the transient voltage response 35 of FIG. 3 and the difference in the droop voltage $V_{DROOP}$. Given that the output capacitance is limited by its effective series resistance (ESR), it can be seen that the piecewise linear load line characteristic of FIG. 4 effectively eliminates one-third of the total output capacitance required.

Figure 5:
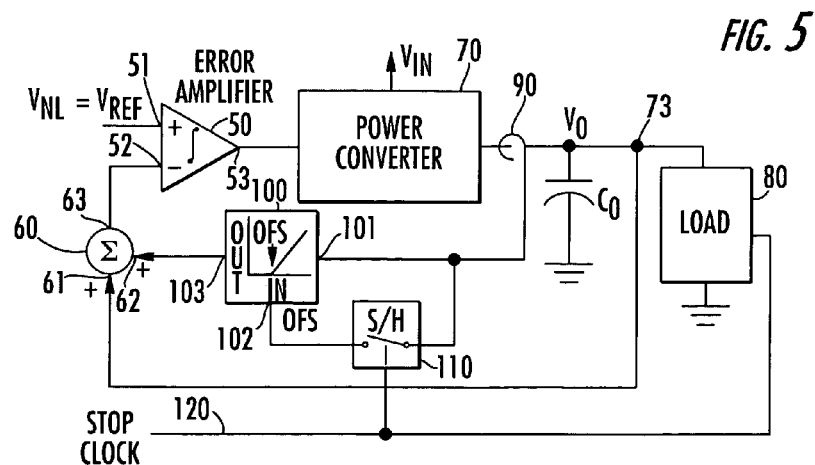
FIG. 5 diagrammatically illustrates a DC converter architecture in accordance with the present invention for implementing the piecewise linear load line characteristic of FIG. 4.

FIG. 5 diagrammatically illustrates a DC converter architecture for implementing the piecewise linear load line characteristic of FIG. 4. As shown therein, a reference input voltage $V_{REF}=V_{NO\ LOAD}$, to which the regulator is referenced, is coupled to a first, non-inverting (+) input 51 of an error amplifier 50. A second, inverting (−) input 52 of the error amplifier is coupled to the output 63 of a voltage summing unit 60. As will be described, voltage summing unit 60 combines the output voltage Vo with a voltage that is a function of the output current defined by the piecewise linear load line of FIG. 4. This serves to make the output voltage follow the maximized load line characteristic of FIG. 4.

The output 53 of the error amplifier 50 is coupled to a power converter 70 (which may be implemented as a pulse width modulator-based buck mode DC—DC converter) that is supplied with an input voltage $V_{IN}$. The output of the power converter 70 is coupled to an output node 73 at which the output voltage Vo is derived. An output capacitance Co and a load 80 are coupled between output node 73 and a reference voltage (e.g., ground). In the present example, it will be assumed that the load is a microprocessor, the operation of which is controlled by a clock signal therefor. Disabling or interrupting the clock serves to reduce the microprocessor load to it's leakage level. For this purpose a stop clock line 120 is employed. The stop clock signal is common on computing platforms and serves to interrupt the sequential clocking of the central processing unit. The present invention makes use of the availability of a stop clock pin provided by the microprocessor manufacturer to measure the leakage current, as will be described.

The output voltage Vo at the output node 73 is fed back to a first input 61 of summing unit 60. (Normally, the voltage at the output node would be fed back to the inverting (−) input 52 of the error amplifier 50, so that the error amplifier would control the operation of the power converter in accordance with the reference voltage. In accordance with the present invention, however, the output voltage is combined with a voltage that is a function of output current based on the piecewise linear load line of FIG. 4, so that the error amplifier causes the output voltage to track that load line.

For this purpose, a current measurement probe 90 is coupled in the output line of the power converter 70 and provides an output representative of the output current being supplied to the load 80. The output current measured by probe 90 is coupled to a first input 101 of a piecewise linear transform unit 100, and to the input of a sample and hold unit 110. Piecewise linear transform unit 100 produces an output voltage that is a function of the output current Io, in accordance with the piecewise load line characteristic of FIG. 4, and in accordance with the value of leakage current is being drawn by the load 80.

The transfer function of transform unit 100, which may be readily implemented using a passive diode-resistor network, is graphically illustrated with the block 100 as producing a fixed output voltage (e.g., zero) associated with a no load condition, for current values at input 101 less than or equal to an offset current OFS (or $I_L$) supplied to an input 102 and thereafter linearly increasing with increase in output current. The value of the offset (OFS) at input 102 of transform unit 100 is provided by sample and hold unit 110.

The piecewise linear voltage $V_{PL}$ produced at output 103 of transform unit 100 is coupled as a second input 62 of the summation unit 60. As pointed out above, the voltage $V_{PL}$ is used to reduce the output voltage Vo as a function of load current. Sample and hold unit 110 is used to derive a sample of the output current being supplied to the load, when clocked by a stop clock signal on line 120. Because the stop clock signal effectively disables the load (microprocessor), the value of the current probe's output, as sampled by the sample and hold unit 110, is effectively representative of the leakage current and serves as a leakage current offset value ($I_{OFS}=I_L$) to input 102 of transform unit 100. Namely, the output current is sampled when the stop clock is asserted and that sampled value is held by the sample and hold unit during the interval that the stop clock is unasserted. The operation of the converter of FIG. 5 may be readily understood by reference to its no load and full load conditions discussed below.

No Load Condition

For a no load condition the output current as measured by current probe 90 is only the leakage current $I_L$. As pointed out above, this current is sampled by sample and hold unit 110 in accordance with the stop clock input and supplied as an offset input to the transform unit 100. For current values equal to or less than the leakage current $I_L$ the output of transform unit 100 is zero. This means that summation unit 60 will sum the voltage Vo at output node 73 with the zero output of transform unit 100, so that the output 63 of summing unit 60 will simply be the output voltage Vo. With the output 63 of the summing unit 60 being coupled to the inverting (−) input 52 of error amplifier 50, the output 53 of amplifier 50 will drive the power converter 70 so as to make the voltage Vo at output node 73 equal to the voltage reference voltage ($V_{REF}=V_{NL}=V_{LEAK}$) supplied to non-inverting (+) input 51 of error amplifier 50. This corresponds to the upper voltage level $V_{LEAK}$ shown at 46 in FIG. 4.

Full Load Condition

For a full load condition, the output current Io as measured by probe 90 is the full load current $I_{FL}$. Since this current is substantially larger than the leakage current $I_L$, the output 103 of transform unit 100 will be a corresponding large value of voltage, here $V_{DROOP}$ as shown at 48 in FIG. 4. (It may be noted that for a less than full load but greater than no load condition, the output of transform unit 100 will be a voltage between $V_{LEAK}$ and $V_{DROOP}$.) This means that summation unit 60 will sum the voltage Vo at output node 73 with the full load voltage $V_{DROOP}$, so that the output 63 of summing unit 60 will be the sum of the output voltage Vo (=$V_{REF}=V_{LEAK}$) and $V_{DROOP}$. This will cause the error amplifier 50 to drive the power converter 70 so as to make the voltage Vo at output node 73 equal to the voltage reference voltage ($V_{REF}=V_{NL}=V_{LEAK}$) minus $V_{DROOP}$. This corresponds to the lower voltage level $V_{DROOP}$ shown at 48 in FIG. 4.

As will be appreciated from the foregoing description, by exhibiting a load line that is piecewise linear so as to include a linearly decreasing segment that varies from the maximum allowable output voltage $V_{LEAK}$ at the leakage current to a full load voltage $V_{DROOP}$ at full load current $I_{FL}$, the voltage regulator of the present invention is able to effectively maximize the available output voltage swing in the presence of a leakage current offset, and thereby requires less output capacitance.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A method of providing a regulated DC voltage comprising the steps of:
    (a) providing a DC voltage converter, which is operative to produce a regulated output voltage; and
    (b) controlling the operation of said DC voltage converter in accordance with a piecewise linear output voltage vs. output current load line characteristic, wherein
    said piecewise linear output voltage vs. output current load line characteristic produces a constant voltage for load current values less than or equal to a leakage current value, and produces a linearly decreasing voltage from said constant voltage to a full load voltage for load current values greater than said leakage current value.

2. A method of providing a regulated DC voltage comprising the steps of:
    (a) providing a DC voltage converter, which is operative to produce a regulated output voltage; and
    (b) controlling the operation of said DC voltage converter in accordance with a piecewise linear output voltage vs. output current load line characteristic, wherein
    said piecewise linear output voltage vs. output current load line characteristic produces a constant voltage for a no load current value, and produces a linearly decreasing voltage from said constant voltage to a full load voltage for load current values greater than said no load current value.

3. For use with a DC converter that is operative to supply a regulated DC output voltage to a load, and having an output voltage vs. output current load line boundary specification comprised of an upper load line characteristic and a lower load line characteristic, a method of optimizing the operation of said DC converter in the presence of a no load leakage current, comprising the steps of:
    (a) causing said DC converter to produce a constant output voltage, corresponding to the voltage $V_{LEAK}$ produced by said upper load line characteristic at said no load leakage current for load current values less than or equal to said leakage current; and (b) causing said DC converter to produce a linearly decreasing voltage from said constant voltage $V_{LEAK}$ to a full load voltage $V_{FULL\ LOAD}$, for load current values greater than said leakage current value.

4. The method according to claim 3, wherein step (a) comprises sampling the output current of said DC converter during a time when no current is being drawn by said load, and storing a parameter representative of leakage current in accordance with the sampled value of said output current, and generating said constant voltage $V_{LEAK}$ representative of said parameter and thereby associated with said no load leakage current, in accordance with said stored parameter.

5. An apparatus for providing a regulated DC voltage comprising:

a DC voltage converter, which is operative to produce a regulated output voltage; and a control circuit which is operative to control the operation of said DC voltage converter in accordance with a piecewise linear output voltage vs. output current load line characteristic, wherein said piecewise linear output voltage vs. output current load line characteristic employed by said control circuit produces a constant voltage for load current values less than or equal to a leakage current value, and produces a linearly decreasing voltage from said constant voltage to a full load voltage for load current values greater than said leakage current value.

6. An apparatus for providing a regulated DC voltage comprising:

a DC voltage converter, which is operative to produce a regulated output voltage; and a control circuit which is operative to control the operation of said DC voltage converter in accordance with a piecewise linear output voltage vs. output current load line characteristic, wherein said piecewise linear output voltage vs. output current load line characteristic employed by said control circuit produces a constant voltage for a no load current value, and produces a linearly decreasing voltage from said constant voltage to a full load voltage for load current values greater than said no load current value.

7. An apparatus for providing a regulated DC voltage comprising:

a DC voltage converter, which is operative to produce a regulated output voltage; and a control circuit which is operative to control the operation of said DC voltage converter in accordance with a piecewise linear output voltage vs. output current load line characteristic, wherein said DC converter has an output voltage vs. output current load line boundary specification comprised of an upper load line characteristic and a lower load line characteristic, and wherein said control circuit is operative to cause said DC converter to produce a constant output voltage, corresponding to the voltage $V_{LEAK}$ produced by sad upper load line characteristic at said no load leakage current for load current values less than or equal to said leakage current, and to cause said DC converter to produce a linearly decreasing voltage from said constant voltage $V_{LEAK}$ to a full load voltage $V_{FULL\ LOAD}$, for load current values greater than said leakage current value.

8. The apparatus according to claim 7, wherein said control circuit is operative to sample the output current of said DC converter during a time when no current is being drawn by said load, and to store a parameter representative of leakage current in accordance with the sampled value of said output current, and to cause said DC converter to generate said constant voltage $V_{LEAD}$ representative of said parameter and thereby associated with said no load leakage current, in accordance with said stored parameter.

9. The apparatus according to claim 8, wherein said control circuit includes a piecewise linear transform unit that produces an output voltage that is a function of said output current in accordance with the piecewise linear transfer function, and in accordance with said sampled and stored parameter representative of leakage current.

10. The apparatus according to claim 9, wherein said DC converter includes an error amplifier having a first input coupled to receive a voltage corresponding to said constant voltage and a second input coupled to receive a sum of the output of said piecewise linear transform unit and said output voltage.

* * * * *